United States Patent
Blanchette et al.

(10) Patent No.: US 7,820,198 B2
(45) Date of Patent: *Oct. 26, 2010

(54) POOL CHEMICAL TABLET

(75) Inventors: David W. Blanchette, Southington, CT (US); G. Warren Ginn, Glen Cove, NY (US)

(73) Assignee: Arch Chemicals, Inc., Norwalk, CT (US)

( * ) Notice: Subject to any disclaimer, the term of this patent is extended or adjusted under 35 U.S.C. 154(b) by 354 days.

This patent is subject to a terminal disclaimer.

(21) Appl. No.: 10/967,985

(22) Filed: Oct. 19, 2004

(65) Prior Publication Data

US 2006/0081810 A1   Apr. 20, 2006

(51) Int. Cl.
  *A61K 9/20* (2006.01)
  *A61K 9/26* (2006.01)

(52) U.S. Cl. .................. 424/464; 424/465; 424/469; 424/470

(58) Field of Classification Search .............. 424/465, 424/489, 464
See application file for complete search history.

(56) References Cited

U.S. PATENT DOCUMENTS

| | | | |
|---|---|---|---|
| 3,668,134 A | 6/1972 | Lamberti et al. | |
| 3,669,891 A | 6/1972 | Greenwood et al. | |
| 3,793,216 A * | 2/1974 | Dychdala et al. | |
| 3,969,546 A | 7/1976 | Saeman | |
| 4,005,028 A | 1/1977 | Heckert et al. | |
| 4,048,351 A | 9/1977 | Saeman et al. | |
| 4,051,056 A | 9/1977 | Hartman | |
| 4,071,605 A * | 1/1978 | Wojtowicz | |
| 4,118,524 A | 10/1978 | Saeman | |
| 4,145,306 A | 3/1979 | Tatara et al. | 252/187.28 |
| 4,146,676 A | 3/1979 | Saeman et al. | |
| 4,174,411 A | 11/1979 | Saeman et al. | |
| 4,192,763 A | 3/1980 | Buchan | 252/187.3 |
| 4,201,756 A | 5/1980 | Saeman et al. | 423/266 |
| 4,216,027 A | 8/1980 | Wages | |
| 4,289,640 A | 9/1981 | Falivene | |
| 4,349,493 A | 9/1982 | Casberg et al. | 264/37.29 |
| 4,380,533 A | 4/1983 | Wojtowicz | |
| 4,539,179 A | 9/1985 | Meloy | |

(Continued)

FOREIGN PATENT DOCUMENTS

RU   2203933 C2   5/2003

(Continued)

OTHER PUBLICATIONS

Extended European Search Report in European Application No. 05798864.4 Oct. 12, 2009.

*Primary Examiner*—Humera N Sheikh
(74) *Attorney, Agent, or Firm*—Dale L. Carlson; Jay H. Anderson; Wiggin and Dana LLP

(57) ABSTRACT

One aspect of the present invention is directed to a solid chemical tablet in a shape comprising an elongated cylindrical side surface and an elongated flat side surface or an elongated concave cut side surface. Another aspect of the present invention is directed to a solid chemical tablet comprising a blend of hydrated calcium hypochlorite with magnesium sulfate heptahydrate. This invention further relates to a solid chemical tablet comprising a blend of solid calcium hypochlorite, and one or more solid alkali metal phosphate.

40 Claims, 2 Drawing Sheets

U.S. PATENT DOCUMENTS

| | | | |
|---|---|---|---|
| D283,649 S | 4/1986 | Casberg | D23/207 |
| 4,615,794 A | 10/1986 | Belanger | |
| 4,668,475 A | 5/1987 | Meloy | |
| 4,692,335 A | 9/1987 | Iwanski | 424/665 |
| 4,865,760 A | 9/1989 | Johnson et al. | 252/187.28 |
| 4,876,003 A | 10/1989 | Casberg | 210/169 |
| 4,923,618 A | 5/1990 | Casberg et al. | 210/755 |
| 4,928,813 A | 5/1990 | Casberg | 206/0.5 |
| 4,931,207 A | 6/1990 | Cramer et al. | |
| 4,961,872 A | 10/1990 | Sinclair | 252/186.37 |
| 4,970,020 A | 11/1990 | Johnson et al. | 252/187.28 |
| 5,009,806 A | 4/1991 | Johnson et al. | 252/187.28 |
| 5,091,165 A | 2/1992 | Shaffer et al. | 423/474 |
| D325,619 S | 4/1992 | Casberg | D23/207 |
| 5,137,731 A | 8/1992 | Casberg | 424/465 |
| 5,164,109 A | 11/1992 | Wojtowicz | 252/175 |
| 5,205,961 A | 4/1993 | Shenefiel et al. | 252/186.37 |
| D335,704 S | 5/1993 | Casberg | D24/101 |
| D335,705 S | 5/1993 | Buckberg et al. | D24/112 |
| 5,407,598 A * | 4/1995 | Olson et al. | |
| 5,610,126 A | 3/1997 | Barford et al. | |
| 5,707,534 A | 1/1998 | Del Corral et al. | |
| 5,753,602 A | 5/1998 | Hung et al. | 510/192 |
| 5,756,440 A | 5/1998 | Watanabe et al. | |
| 5,888,528 A | 3/1999 | Wellinghoff et al. | |
| 5,914,040 A | 6/1999 | Pescher et al. | |
| 5,958,853 A | 9/1999 | Watanabe | |
| 6,605,304 B1 * | 8/2003 | Wellinghoff et al. | 424/489 |
| 6,638,446 B1 * | 10/2003 | Mullins | |
| 6,863,830 B1 * | 3/2005 | Purdy et al. | |
| 6,984,398 B2 * | 1/2006 | Brennan et al. | 424/464 |
| 7,045,077 B2 * | 5/2006 | Garris | |
| 7,410,938 B2 * | 8/2008 | Brennan | 510/380 |
| 2005/0187120 A1 * | 8/2005 | Brennan | 510/218 |

FOREIGN PATENT DOCUMENTS

| | | |
|---|---|---|
| WO | WO 90/12505 | 11/1990 |
| WO | WO 00/04128 | 1/2000 |
| WO | WO 00/04129 A2 | 1/2000 |

* cited by examiner

POOL CHEMICAL TABLET

BACKGROUND OF THE INVENTION

1. Field of the Invention

The present invention relates to a particular shaped pool chemical tablet. More particularly, the present invention relates to a chemical tablet that is easily identifiable and provides consistent chemical dissolution in a body of water.

2. Brief Description of Art

Sanitization of water is important to everyday life. Drinking water, bathing water and swimming water need to be properly sanitized to prevent unhealthy levels of bacteria, fungi and other contaminants. A typical method for sanitizing bathing and swimming water employs dissolving a tablet, briquette, or solution comprising the desired sanitizing chemicals in the water.

A common problem in treating bodies of water, such as swimming pools, with sanitizing chemicals has been providing a dispensing article that allows uniform distribution of the sanitizing chemicals into the body of water. Attempts in the art have culminated in the use of pressed tablets of varying forms such as briquettes, circular, cylindrical, or elliptical blocks that have means for metering the sanitizing chemical into the surrounding water.

An additional concern in this field includes the safety of humans and animals when they are exposed to high amounts of highly concentrated pool chemicals. Therefore pool chemical tablets are preferably formed so as to allow an even, controlled dispersion of the chemicals in the body of water. Better control of the dispersion of the chemicals is always desired when tablets are created.

There is also a further need in the art for consumers to have the ability to distinguish different pool chemicals from others. It is known that the use of chemicals, even household products containing certain chemicals require some precautions. It would be helpful for a consumer to be able to visually distinguish one type of pool chemical tablet from another to avoid unwanted reactions. Differently shaped pool chemical tablets is one option of visual distinguishment.

U.S. Pat. No. 4,876,003 to Casberg relates to a package for a water sanitizing chemical that permits the chemical to dissolve uniformly and over a substantially long period of time. This patent describes an elongated halogen compound containing tablet with an elongate central section connecting two opposing obliquely and inwardly tapered ends encased by a tablet shell of the same configuration but having openings in the ends. The openings in the shell allow the chemical to dissolve through into the body of water.

Likewise, U.S. Pat. No. 4,928,813 to Casberg relates to a capsule and a method of making a capsule for use in the dissolution of a chlorine chemical into a body of water. This patent discloses a capsule that generally comprises a tablet section and a shell means. The tablet sections comprises at least one halogen chemical compound tablet. The tablet section has an elongate center section with two opposite end sections. The shell means is securely fitted about the tablet section. The shell means have two end portions adjacent to the tablet end sections. Each of the end portions comprises a tablet wall with an aperture therethrough and an extension having a conduit means or flow passage therethrough. This causes water to pass through the extensions and the apertures to access the tablet section such that the shell means reduces the dissolving rate of the halogen compound. This tablet was designed to last a longer time than other tablets and to dissolve at a relatively even rate Additionally, U.S. Pat. No. 5,137,731 to Casberg discloses a pool chemical tablet design which has a donut shape with a close-fitting peripheral water impervious barrier. The barrier is a certain size in relation to the tablet size and hole diameter to achieve a very even dissolving rate of a desired magnitude.

U.S. Design Pat. Nos. 283,649 and 625,619 to Casberg demonstrate different shapes of pool chemical tablets used in the art to provide even distribution of pool chemicals into surrounding bodies of water that do not pose a danger to users of the water.

Despite the above-mentioned advancements in the art, what is needed is a pool chemical tablet that is shaped to be visually distinctive from other tablets, and shaped to allow easy handling while providing an even and safe distribution of pool chemicals into the surrounding body of water. Ideally the chemical tablet would not easily clog, trap, or otherwise interfere with any other components of a filtration system or the like.

BRIEF SUMMARY OF THE INVENTION

Therefore, one aspect of the present invention is directed to a chemical tablet for use as a sanitizer in pool chemicals having an upper flat surface and a lower flat surface connected by a first elongated cylindrical side surface and a second elongated flat or concave cut side surface.

Another aspect of the present invention is directed to a chemical tablet having an upper flat surface and a lower flat surface connected by a first elongated cylindrical side surface and a second elongated flat or concave cut side surface wherein the chemical tablet comprises hydrated calcium hypochlorite.

Yet another aspect of the present invention is directed to a chemical tablet having an upper flat surface and a lower flat surface connected by a first elongated cylindrical side surface and a second elongated flat or concave cut side surface, wherein the chemical tablet comprises a blend of hydrated calcium hypochlorite with magnesium sulfate heptahydrate, wherein the blend comprises at least about 17% by weight of water based on the total weight of the blend, from about 0.1% to about 10% of lime based on the total weight of the blend, at least about 25% by weight of magnesium sulfate heptahydrate and less than about 75% by weight of hydrated calcium hypochlorite.

Yet another aspect of the present invention relates to a chemical tablet having an upper flat surface and a lower flat surface connected by a first elongated cylindrical side surface and a second elongated flat or concave cut side surface, wherein the chemical tablet comprises a blend of hydrated calcium hypochlorite and an alkali metal phosphate.

A further aspect of the present invention relates to a chemical tablet having an upper flat surface and a lower flat surface connected by a first elongated cylindrical side surface and a second elongated flat or concave cut side surface wherein the chemical tablet comprises a blend of a hydrated calcium hypochlorite, a scale inhibiting solid alkali metal phosphate and a residue dispersing solid alkali metal phosphate.

Advantages to the present invention include: even dissolution of the sanitizing chemicals, scale inhibition, and residue dispersion. Another advantage of the present invention is controlled dispersion of the chemicals into the pool water it sanitizes. Easy recognition of this pool chemical tablet by its unique shape is yet another advantage of the present invention.

DETAILED DESCRIPTION OF THE INVENTION

As used in the present specification and claims, the term "D-shaped" means an article is in the shape of the capital letter D.

As used in the present specification and claims, the term "moon shaped" means an article is in the shape of a crescent moon, namely one side of the article has a concave shape.

The term "tablet" as used in the present specification and claims covers any shape or size tablet, or other compressed shaped product made of sanitizing chemicals required in the present invention.

The term "blend" as used in the present specification and claims refers to an homogeneous or near homogeneous mixture of the materials as described herein.

The term "hydrated" as used in conjunction with calcium hypochlorite products in the present specification and claims refers to any calcium hypochlorite product that has a water content of at least 5% by weight of calcium hypochlorite product.

The term "average dissolving rate" as used in the present invention, unless otherwise identified, is used to mean the static average dissolving rate of the tabletted blends of the present invention in a standing volume of water.

The term "coloring agent" as used in the present specification and claims refers to any chemical, pigment, dye, tint, or other substance, that provides color to the chemical tablet of the present invention.

Figure 1:
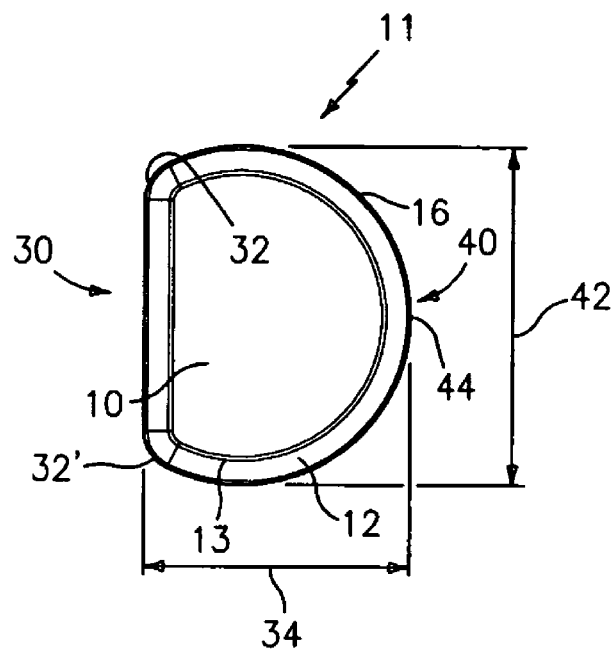
FIG. 1 is a top perspective view of a pool chemical tablet with an elongated flat side surface according to the present invention.

Referring to FIG. 1, a chemical tablet 11 is shown which illustrates one embodiment of the tablet of the present invention. The chemical tablet 11, also illustrated in FIGS. 2-4, has a unique D-shaped structure.

FIGS. 1-4 illustrates one embodiment of a chemical tablet 11 of the present invention. The chemical tablet has an upper flat surface 10 and a lower flat surface 20. The upper flat surface 10 is connected to the lower flat surface 20 by a first elongated cylindrical side surface 40 and a second elongated flat side surface 30.

Figure 4:
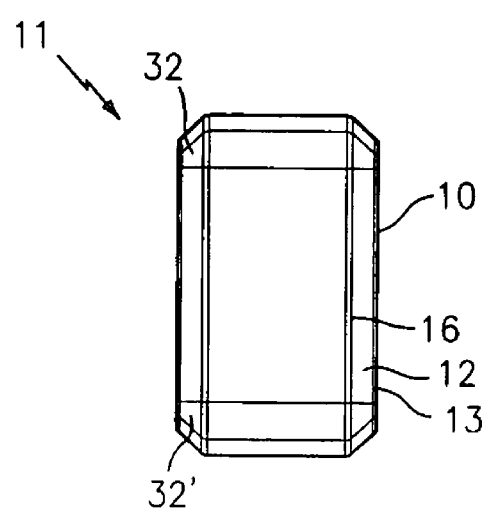
FIG. 4 is a view of the pool chemical tablet of FIG. 1 showing the elongated flat side surface of the chemical tablet.

The second elongated flat side surface 30 has two edges 32 and 32' as shown in FIG. 4. Edges 32 and 32' aid in forming the particular shape of chemical tablet 11 as well as minimize stress that may cause cracking or breaking of the chemical tablet.

As shown in FIG. 1, upper flat surface 10 can be connected to an upper beveled edge 12. The upper flat surface and upper beveled edge are connected by an upper inner edge 13. The upper beveled edge 12 follows the perimeter of the upper flat surface of the chemical tablet. The width 14 of the upper beveled edge is about 0.25 inches as measured from an upper outer edge 16 to upper inner edge 13 as shown in FIG. 2.

Figure 2:
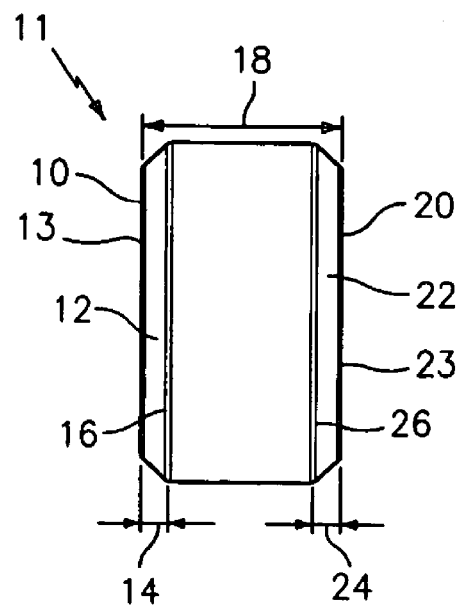
FIG. 2 is a side perspective view of the pool chemical tablet of FIG. 1.
Figure 3:
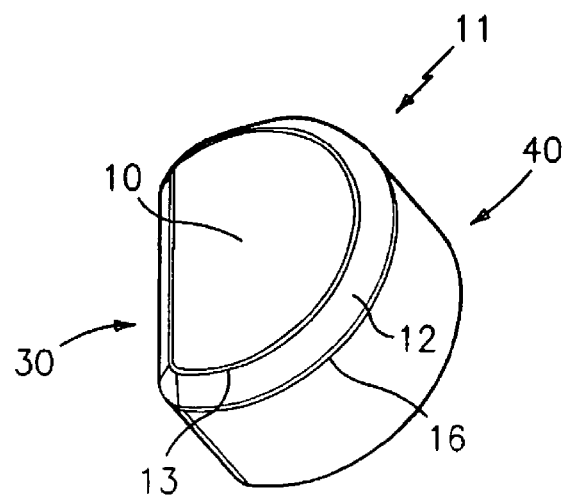
FIG. 3 is a view of the pool chemical tablet of FIG. 1 showing the cylindrical side surface of the chemical tablet.

As can be seen in FIG. 2, the lower flat surface 20 of the chemical tablet may also be connected to a lower beveled edge 22. The lower flat surface 20 is connected to lower beveled edge 22 by lower inner edge 23. The lower beveled edge 22 follows the perimeter of the lower flat surface of the chemical tablet. The width 24 of the lower beveled edge is about 0.25 inches as measured from a lower outer edge 26 to lower inner edge 23. Widths 14 and 24 are preferably the same size.

Preferably, chemical tablet 11 of the present invention has an upper beveled edge connected to the upper flat surface and a lower beveled edge connected to the lower flat surface as shown in FIG. 2. This particular shape aids in distinguishing the chemical tablet from other chemical tablets used in water sanitization.

Although other dimensions may be suitable for the chemical tablet of the present invention, preferably, chemical tablet 11 conforms to certain dimensions to maintain optimum average dissolving rate of less than 150 grams/day for a 100% by weight hydrated calcium hypochlorite tablet. Preferably chemical tablet 11 has a volume of 10.2 cubic inches and preferably its weight is about 300 grams. Ideally, chemical tablet 11 has a surface area of 25.1 square inches. The surface area of chemical tablet 11 contacted by the water at the feeder's highest feed rate is 13.5 square inches. This contact area at a maximum flow rate of 2.0 gpm gives a desired feed rate of 20 lbs available chlorine per day for a straight 100% hydrated calcium hypochlorite tablet.

Additionally, while other dimensions may be suitable for the chemical tablet of the present invention, as shown in FIGS. 1 and 2, it is preferred that the elongated cylindrical side surface 40 is formed having a diameter of about 3 inches (if completely cylindrical) as noted by reference number 42. Additionally, it is preferred that the distance 34 from an apex 44 of the elongated cylindrical side surface 40 and the elongated flat surface 30 is about 2.37 inches. Further, it is preferred that the distance 18 from the upper flat surface 10 and the lower flat surface 20 is about 1.7 inches.

A preferred embodiment of the chemical tablet has an elongated cylindrical side surface 40 of a diameter of about 3 inches (if totally cylindrical in shape), a distance from an the apex 44 of the elongated cylindrical side surface 40 and the elongated flat surface 30 of about 2.37 inches, and a distance 18 from the upper flat surface 10 and the lower flat surface 20 of about 1.7 inches.

Figure 5:
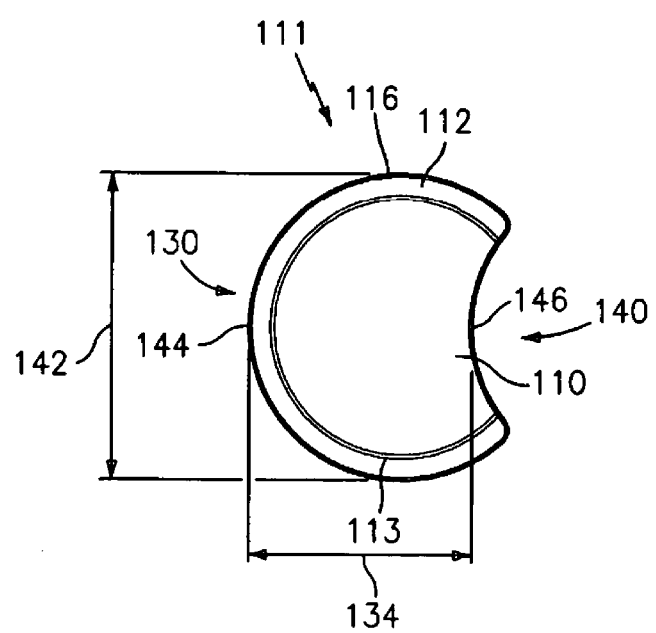
FIG. 5 is a top perspective view of a pool chemical tablet with an elongated concave cut side surface according to the present invention.
Figure 6:
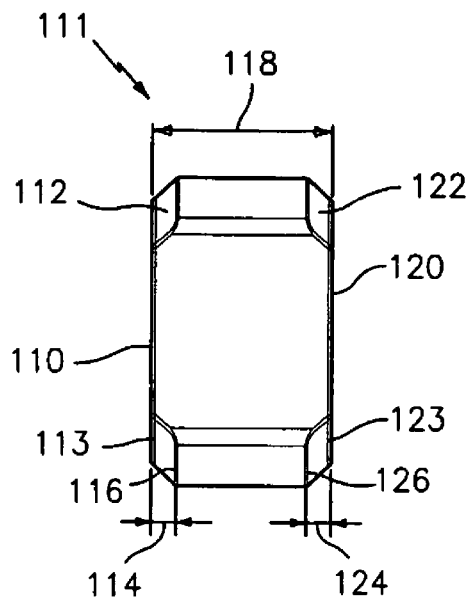
FIG. 6 is a side perspective view of the pool chemical tablet of FIG. 5.
Figure 7:
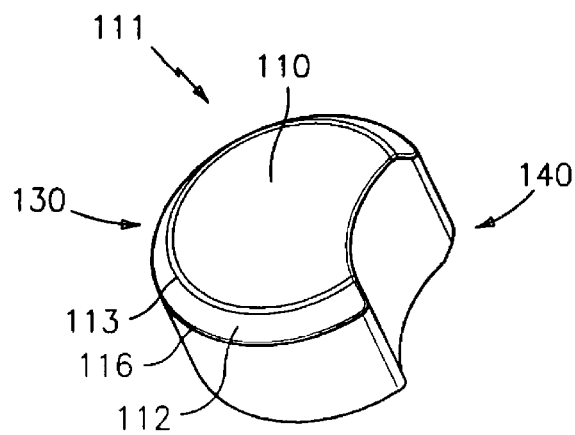
FIG. 7 is a view of the pool chemical tablet of FIG. 5 showing the concave cut side of the chemical tablet.

As shown in FIGS. 5-7, the chemical pool tablet of the present invention can alternatively be moon shaped, that is, having an elongated concave cut side surface unstead of an elongated flat surface found in the prior embodiment. The pool chemical tablet of this alternative embodiment has an upper flat surface 110 and a lower flat surface 120. Upper flat surface 110 is connected to lower flat surface 120 by a first elongated cylindrical side surface 130 and a second elongated concave cut side surface 140. The concave cut side surface 140 can be of any concave curvature.

Any curvature may be used for this elongated concave cut side. The curvature may be created when the granular material is compressed into a mold to form the desired shape of the tablet. Preferably, the curvature of this concave cut is formed with a radius of 1.5 inches and cuts into a 3 inch round tablet such that there would be a distance of 2.24 inches from the opposite side of the tablet to the deepest point on the concave cut-out as shown in FIG. 5-7. This preferred shape provides an optimum surface area.

As shown in FIG. 5, upper flat surface 110 can be connected to an upper beveled edge 112. The upper flat surface and upper beveled edge are connected by an upper inner edge 113. The upper beveled edge 112 follows the perimeter of the upper flat surface of the chemical tablet. The width 114 of the upper beveled edge is about 0.25 inches as measured from an upper outer edge 116 to upper inner edge 113.

As can be seen in FIG. 6, the lower flat surface 120 of the pool tablet may also be connected to a lower beveled edge 122. The lower flat surface 120 is connected to lower beveled edge 122 by lower inner edge 123. The lower beveled edge 122 follows the perimeter of the lower flat surface of the pool tablet. The width 124 of the lower beveled edge is about 0.25 inches as measured from a lower outer edge 126 to a lower inner edge 123.

Preferably, chemical tablet 111 has an upper flat surface connected to an upper beveled edge and a lower flat surface connected to a lower beveled edge as shown in FIG. 6. This particular shape aids in distinguishing the chemical tablet from other chemical tablets used in water sanitization.

Although other dimensions may be suitable for this embodiment of the chemical tablet, preferably chemical tablet 111 conforms to certain dimensions to maintain optimum dissolving rate of less than 150 grams per day for a 100% hydrated calcium hypochlorite tablet. Preferably chemical tablet 111 has a weight of about 300 grams.

Ideally, chemical tablet 111 has a surface area of at least 25.1 square inches, but more preferably 25.9 square inches. The surface area of chemical tablet 111 contacted by the water at the feeder's highest feed rate is 13.5 square inches. This contact area at a maximum flow rate of 2.0 gpm gives a desired feed rate of 20 pounds of available chlorine per day for a 100% hydrated calcium hypochlorite tablet.

Additionally, while other dimensions may be suitable for the chemical tablet 111, as shown in FIGS. 5 and 6, it is preferred that the elongated concave cut side surface 140 is formed having a diameter of about 3 inches (if the tablet were completely cylindrical) as noted by reference number 142. Additionally, it is preferred that the distance 134 from an apex 144 of the elongated side surface 130 and a point 146 on the elongated concave cut side surface 140 is about 2.24 inches. Further it is preferred that the distance 118 from the upper flat surface 110 and the lower flat surface 120 is about 1.75 inches.

One embodiment of chemical tablets 11 and 111 of the present invention preferably comprises only pressed granular hydrated calcium hypochlorite. Chemical tablet 11 may alternatively additionally contain a coloring agent such as ultramarine blue, phthalocyanine blue or phthalocyanine green besides the hydrated calcium hypochlorite.

Preferably the calcium hypochlorite is present in an amount that allows 47% of the chlorine to be available for sanitizing uses. This composition preferably contains at least about 25% by weight of magnesium sulfate heptahydrate and less than about 75% by weight of hydrated calcium hypochlorite. More preferably, the composition contains from about 25% to about 40% magnesium sulfate heptahydrate and about 60% to about 75% by weight of hydrated calcium hypochlorite. The amount of water in the blend should be at least about 17% by weight of the total blend; more preferably, about 18% to about 24% by weight of the blend. The granular magnesium sulfate heptahydrate is physically blended with granular hydrated calcium hypochlorite to produce an essentially homogeneous granular mixture.

This embodiment may also contain small amounts of other materials. One preferred material is lime ($Ca(OH)_2$) which may be included in amounts up to about 10% by weight preferably from about 01% to about 10% by weight, more preferably about 0.5% to about 3%, and most preferably about 1% to about 2% of the total amount of the blend of the two ingredients.

The amount of water in chemical tablets 11 and 111 may be calculated by any standard analytical method for measuring water in chemical products like these. Our preferred method is thermogravimetric analysis (TGA).

Additionally, the above-described embodiment may also comprise a coloring agent. A coloring agent added to the above-described embodiment would help consumer distinguish between this formula and others that are available. As mentioned above, the ability to distinguish between different chemicals is important to customer safety.

Coloring agents that are preferred include, but are not limited to, ultramarine blue, phthalocyanine blue, and phthalocyanine green. Preferably, the concentration of the coloring agent is between 0.01 and 0.5%. Ideally, the concentration is 0.05%.

Another embodiment of the present invention comprises hydrated calcium hypochlorite in an amount which allows approximately 68% of the chlorine to be available for sanitizing purposes. Preferably, commercial calcium hypochlorite product such as HtH® and CCH® products available from Arch Chemicals, Inc. of Norwalk, Conn. have a minimum available chlorine content ranging from about 65 weight percent to about 75 weight percent. The remainder of such commercially available calcium hypochlorite products usually consists of water and inorganic calcium and alkali metal salts. Typically, the salts present include sodium chloride, calcium chloride, calcium hydroxide, and the like.

Additionally, the hydrated calcium hypochlorite in this embodiment can further be combined with an alkali metal phosphate. The alkali metal of the solid alkali metal phosphate may be lithium, sodium or potassium. Preferably the alkali metal in the alkali metal phosphate is sodium. The preferred alkali metal phosphate in the present embodiment is sodium tripolyphosphate (STPP). STPP is used to inhibit the development of scale deposits that sometimes occurs in using such calcium hypochlorite based tablets.

The hydrated calcium hypochlorite component in this embodiment is preferably at least about 95% of the total weight of all ingredients present in the tablet. Most preferably, the hydrated calcium hypochlorite component is from about 98.5% to about 99.5% of the total weight of the ingredients of the tablet. The alkali metal phosphate STPP is typically present in this embodiment in an amount of at least 0.1% but not more than 4.5% by weight, based on the weight of the total weight of the ingredients of the tablet. More preferably, the STPP is present in an amount from about 0.2% to 1.0% by weight, based on the total weight of the total weight of the ingredients of the tablet. Most preferably, the STPP is present in an amount of about 0.5% by weight based on the total weight of the ingredients of the tablet.

The above embodiment of the chemical tablet may also contain a coloring agent. Examples of suitable coloring agents include ultramarine blue, phthalocyanine blue, or phthalocyanine green.

In yet another embodiment, the hydrated calcium hypochlorite as described above that has approximately 68% available chlorine, may be blended with a combination of two or more alkali metal phosphates such as STPP and sodium hexametaphosphate (SHMP). SHMP is a residue-dispersing alkali metal phosphate.

Similar to the embodiment described above, the hydrated calcium hypochlorite component in this embodiment is preferably at least about 95% of the total weight of all ingredients present in the tablet. Most preferably, the hydrated calcium hypochlorite component is from about 98.5% to about 99.5% of the total weight of the ingredients of the tablet.

Each alkali metal phosphate is present in this embodiment in an amount of at least 0.1% but not more than 4.5% by weight, based on the total weight of the ingredients present in the tablet of the present embodiment. More preferably, each alkali metal phosphate is present in an amount of at least 0.2% but not more than 1.0% by weight, based on the total weight of the ingredients present in the tablet of the present embodiment. Most preferably, each alkali metal phosphate is present in an amount no less or more than 0.5% by weight, based on the total weight of the ingredients present in the tablet of the present embodiment.

An advantage of this embodiment includes reduced scale deposits and blocked passageways of filters and the like, when the embodiment is used in water treatment applications in which feeding equipment is employed, such as swimming pools, hot tubs, and spas.

Likewise, a colorant agent such as the examples given above may be added to this chemical tablet embodiment that contains one or more alkali metal phosphates in combination with the hydrated calcium hypochlorite.

Typically a chemical tablet for use in water sanitization is formed by methods known in the art, including: using tabletting equipment such as hydraulic presses or briquetting apparatus. Any suitable dwell times and pressures may be used in operating the hydraulic presses.

Preferably, the chemical tablet of the present invention is placed in a feeder or skimmer unit of a swimming pool. More preferably, the chemical tablet is placed in a "wave" technology chlorinator. The chemical tablet of the present invention may also be used in the sanitization of spas or hot tubs.

The chemical tablets 11 and 111 of the present invention has an average dissolving rate of less than about 150 grams/day for straight 100% hydrated calcium hypochlorite. In other words, a 300 gram tablet will take at least 2 days to dissolve completely in a standing (non-flowing) body of water. Preferably, the average dissolving rate is less than 100 grams per day for the tablets of the present invention. It should be recognized that the average dissolving rate of the chemical tablets 11 and 111 of the present invention will generally have higher dissolving rates in flowing water conditions such as in a skimmer or a feeder in a swimming pool.

The present invention is further described in detail by means of the following Examples. All parts and percentages are by weight and all temperatures are degrees Celsius unless explicitly stated otherwise.

EXAMPLES

Example 1

The chemical tablet 11 as illustrated in FIGS. 1-4 can be formed by using methods of tabletting known in the art, such as a hydraulic press or a briquetting apparatus. The D shaped tablet as shown in these figures can be easily distinguished from other tablets or briquettes that are used in water sanitization.

Example 2

The chemical tablet 111 as illustrated in FIGS. 5-7 can be formed by using methods of tabletting known in the art, such as a hydraulic press or a briquetting apparatus. The moon shaped tablet as shown in these figures can be easily distinguished from the other tablets or briquettes that are used in water sanitization.

While the invention has been described above with reference to specific embodiments thereof, it is apparent that many changes, modifications, and variations can be made without departing from the inventive concept disclosed herein. Accordingly, it is intended to embrace all such changes, modifications and variations that fall within the spirit and broad scope of the appended claims. All patent applications, patents and other publications cited herein are incorporated by reference in their entirety.

What is claimed is:

1. A chemical tablet for use as a sanitizer in pool chemicals and having a distinctive shape for improved user safety, the chemical tablet comprising:
    an upper flat surface; and
    a lower flat surface,
wherein
    the upper flat surface and the lower flat surface are opposite extremities of the tablet and are connected by a first elongated side surface and a second elongated side surface, wherein the second elongated side surface is an elongated flat side surface or an elongated concave cut side surface so that the chemical tablet has a non-cylindrical shape,
    the shape renders the chemical tablet readily distinguishable from tablets of differing composition, thereby facilitating user safety,
    the chemical tablet further comprises a blend of:
        a hydrated calcium hypochlorite; and
        a scale inhibiting solid alkali metal phosphate,
    the chemical tablet has a single layer bounded by the upper flat surface and the lower flat surface, said blend being disposed throughout said single layer, and
    the chemical tablet further comprises a coloring agent.

2. The chemical tablet of claim 1 wherein the coloring agent is ultramarine blue, phthalocyanine blue or phthalocyanine green.

3. The chemical tablet of claim 1 wherein the scale inhibiting solid alkali metal phosphate is present in an amount from about 0.1% to about 4.5% by weight based on the total weight of the tablet.

4. The chemical tablet of claim 3 wherein the scale inhibiting solid alkali metal phosphate is sodium tripolyphosphate.

5. The chemical tablet of claim 1 wherein the upper flat surface and the lower flat surface are connected by a first elongated cylindrical side surface and a second elongated flat side surface, the distance from an apex of the first elongated cylindrical side surface and the second elongated flat side surface is of about 2.37 inches, and a distance from the upper flat surface and the lower flat surface is of about 1.7 inches.

6. The chemical tablet of claim 1, wherein the second elongated side surface is an elongated concave cut side surface.

7. A chemical tablet for use as a sanitizer in pool chemicals and having a distinctive shape and color for improved user safety, the chemical tablet comprising hydrated calcium hypochlorite, the tablet having a shape comprising
- an upper flat surface; and
- a lower flat surface, wherein
- the upper flat surface and the lower flat surface are opposite extremities of the tablet and are connected by a first elongated side surface and a second elongated side surface, wherein the second elongated side surface is an elongated flat side surface or an elongated concave cut side surface so that the chemical tablet has a non-cylindrical shape, the chemical tablet thereby rendered readily distinguishable in appearance from tablets of differing composition to facilitate user safety,
- the chemical tablet has a single layer bounded by the upper flat surface and the lower flat surface, said hydrated calcium hypochlorite being disposed throughout said single layer, and
- the chemical tablet further comprises a coloring agent for providing the chemical tablet with a distinctive color, the coloring agent being ultramarine blue, phthalocyanine blue or phthalocyanine green.

8. The chemical tablet of claim 1, further comprising a residue dispersing solid alkali metal phosphate.

9. The chemical tablet of claim 8 wherein the residue dispersing solid alkali metal phosphate is present in an amount from 0.1% to about 4.5% by weight based on the total weight of the tablet.

10. The chemical tablet of claim 8 wherein the residue dispersing solid alkali metal phosphate is sodium hexametaphosphate.

11. A chemical tablet for use as a sanitizer in pool chemicals and having a distinctive shape for improved user safety, the chemical tablet comprising:
- an upper flat surface; and
- a lower flat surface, wherein
- the upper flat surface and the lower flat surface are connected by a first elongated side surface and a second elongated side surface, wherein the second elongated side surface is an elongated flat side surface or an elongated concave cut side surface so that the chemical tablet has a non-cylindrical shape,
- the shape renders the chemical tablet readily distinguishable from tablets of differing composition, thereby facilitating user safety,
- the chemical tablet further comprises a blend of:
  - a hydrated calcium hypochlorite; and
  - a scale inhibiting solid alkali metal phosphate,
- the chemical tablet further comprises a coloring agent, and
- the chemical tablet has a dissolving rate in accordance with dimensions thereof.

12. The chemical tablet of claim 11 wherein the chemical tablet has a dissolving rate in accordance with a surface area of the chemical tablet.

13. The chemical tablet of claim 12 wherein the chemical tablet has a dissolving rate in standing water of less than 150 grams per day.

14. A chemical tablet for use as a sanitizer in pool chemicals
consisting essentially of:
a pressed granular mixture of hydrated calcium hypochlorite and an alkali metal phosphate,
the mixture being homogeneous or near homogeneous;
the chemical tablet having an upper flat surface and a lower flat surface, wherein the upper flat surface and the lower flat surface are connected by a first elongated side surface and a second elongated side surface, wherein the second elongated side surface is an elongated flat side surface or an elongated concave cut side surface so that the chemical tablet has a non-cylindrical shape.

15. The chemical tablet of claim 14, wherein said mixture additionally contains an additive.

16. The chemical tablet of claim 15, wherein said additive is a coloring agent.

17. A chemical tablet for use as a sanitizer in pool chemicals
consisting essentially of:
a pressed granular mixture of hydrated calcium hypochlorite and an additive, the mixture
being homogeneous or near homogeneous;
the chemical tablet having an upper flat surface and a lower flat surface, wherein the upper flat surface and the lower flat surface are connected by a first elongated side surface and a second elongated side surface, wherein the second elongated side surface is an elongated flat side surface or an elongated concave cut side surface so that the chemical tablet has a non-cylindrical shape.

18. The chemical tablet of claim 17 wherein the additive is an alkali metal phosphate.

19. The chemical tablet of claim 17 wherein the additive contains a coloring agent.

20. The chemical tablet of claim 17 wherein the additive is at least one of sodium tripolyphosphate (STPP) and sodium hexametaphosphate (SHMP).

21. The chemical tablet of claim 17 wherein the additive is a combination of magnesium sulfate heptahydrate and an alkali metal phosphate.

22. A chemical tablet for use as a sanitizer in pool chemicals
consisting essentially of:
a pressed granular mixture of hydrated calcium hypochlorite and an additive, the mixture being homogeneous or near homogeneous; and
a coloring agent,
the chemical tablet having an upper flat surface and a lower flat surface, wherein the upper flat surface and the lower flat surface are connected by a first elongated side surface and a second elongated side surface, wherein the second elongated side surface is an elongated flat side surface or an elongated concave cut side surface so that the chemical tablet has a non-cylindrical shape.

23. The chemical tablet of claim 22 wherein the additive is an alkali metal phosphate.

24. The chemical tablet of claim 22 wherein the additive is at least one of sodium tripolyphosphate (STPP) and sodium hexametaphosphate (SHMP).

25. The chemical tablet of claim 22 wherein the additive is a combination of magnesium sulfate heptahydrate and an alkali metal phosphate.

26. The chemical tablet of claim 1 wherein the upper flat surface is connected to an upper beveled edge.

27. The chemical tablet of claim 26 wherein the distance between the upper beveled edge and an outer edge of the chemical tablet is about 0.25 inches.

28. The chemical tablet of claim 1 wherein the lower flat surface is connected to a lower beveled edge.

29. The chemical tablet of claim 28 wherein the distance between the lower beveled edge and an outer edge of the chemical tablet is about 0.25 inches.

30. The chemical tablet of claim 1 wherein the upper flat surface is connected to an upper beveled edge and the lower flat surface is connected to a lower beveled edge.

31. The chemical tablet of claim 1 wherein a distance from an apex of the first elongated cylindrical side surface and the second elongated flat side surface is about 2.37 inches.

32. The chemical tablet of claim 1 wherein a distance from the upper flat surface and the lower flat surface is at least 1.7 inches.

33. The chemical tablet of claim 1 wherein a distance from an apex of the first elongated cylindrical side surface and a point on the second elongated concave cut side surface is about 2.24 inches.

34. The chemical tablet of claim 1 wherein said chemical tablet dissolves at a rate of about less than 150 grams per day.

35. The chemical tablet of claim 1 wherein the chemical tablet comprises a blend of hydrated calcium hypochlorite with magnesium sulfate heptahydrate, wherein the blend comprises at least about 17% by weight of water based on the total weight of the blend, from about 0.1% to about 10% of lime based on the total weight of the blend, at least 25% by weight of magnesium sulfate heptahydrate and less than about 75% by weight of hydrated calcium hypochlorite.

36. The chemical tablet of claim 35 wherein the coloring agent is ultramarine blue, phthalocyanine blue or phthalocyanine green.

37. The chemical tablet of claim 7 wherein the chemical tablet comprises a blend of hydrated calcium hypochlorite and at least one alkali metal phosphate.

38. The chemical tablet of claim 37 wherein the alkali metal phosphate is sodium tripolyphosphate.

39. The chemical tablet of claim 35 wherein sodium tripolyphosphate is present in an amount from about 0.1% to about 4.5% by weight based on the total weight of the chemical tablet.

40. The chemical tablet of claim 7 wherein the chemical tablet comprises a blend of:

a hydrated calcium hypochlorite;

a scale inhibiting solid alkali metal phosphate; and a residue dispersing solid alkali metal phosphate.

* * * * *